US006628535B1

(12) United States Patent
Wu

(10) Patent No.: US 6,628,535 B1
(45) Date of Patent: Sep. 30, 2003

(54) VOLTAGE CONVERTER WITH SELECTABLE DC OUTPUT VOLTAGE LEVEL

(75) Inventor: Michael Wu, Hsin Tien (TW)

(73) Assignee: Formosa Electronic Industries Inc., Taipei Hsien (TW)

( * ) Notice: Subject to any disclaimer, the term of this patent is extended or adjusted under 35 U.S.C. 154(b) by 10 days.

(21) Appl. No.: 10/101,410

(22) Filed: Mar. 20, 2002

(51) Int. Cl.[7] .................................... H02M 1/00
(52) U.S. Cl. .................................... 363/146
(58) Field of Search .................... 363/146; 323/293, 323/297

(56) References Cited

U.S. PATENT DOCUMENTS

| | | | | | |
|---|---|---|---|---|---|
| 5,204,991 | A | * | 4/1993 | Law | 307/10.7 |
| 5,347,211 | A | * | 9/1994 | Jakubowski | 323/351 |
| 5,653,906 | A | * | 8/1997 | Fowler et al. | 219/716 |
| 5,903,117 | A | * | 5/1999 | Gregory | 318/254 |
| 6,061,261 | A | * | 5/2000 | Chen et al. | 363/146 |
| 6,128,602 | A | | 10/2000 | Northington et al. | |
| 6,157,139 | A | * | 12/2000 | Gibboney, Jr. | 315/185 S |

* cited by examiner

*Primary Examiner*—Adolf D. Berhane
(74) *Attorney, Agent, or Firm*—Rosenberg, Klein & Lee

(57) ABSTRACT

An electric adapter system includes an adapter including a circuit connected between input and output connection devices respectively connectable with an external power source and a power consuming device. The output connection device is mateable with a connector forming an output member for engaging the power consuming device. The circuit includes a voltage level control device and a feedback device. The voltage level control device supplies an output voltage to the output connection device via positive and negative power terminals. The feedback device includes a plurality of voltage selection lines each having a different electric resistance whereby by selectively connecting one of the voltage selection lines to the negative power terminal, a feedback signal is generated by the feedback device and applied to the voltage level control device for changing the voltage level of the output voltage of the voltage level control device.

14 Claims, 6 Drawing Sheets

VOLTAGE CONVERTER WITH SELECTABLE DC OUTPUT VOLTAGE LEVEL

BACKGROUND OF THE INVENTION

1. Field of the Invention

The present invention relates generally to an electric adapter, and in particular to an electric adapter having DC (Direct Current) outputs of different voltage levels.

2. Description of the Prior Art

Mobile electric appliances, such as mobile phones and notebook computers, are provided with a built-in power source comprised of rechargeable batteries. The mobile electric appliance can also receive power from an electric main or other external power sources. For example, some of the passenger airplanes provide power sockets in the passenger seats. Another external power source that is readily available is the electric power socket provided on an instrument panel of a car. To receive power from such external power sources, an adapter system is required for each particular mobile device that is mechanically and electrically compatible with the adapter system. Of particular concern of the adapters is the output level of voltage which must be corresponding to the rating voltage of the mobile device in order to properly drive the mobile device and not to cause damage to the mobile device due to excessive voltage level.

An adapter system for selectively providing DC outputs of different voltages is available in the market. The conventional adapter system comprises a number of individual connectors selectively and exchangeably coupled to the adapter system. Each individual connector comprises a resistor of different resistance. Different resistances of the connectors, once coupled to the adapter system, provide different feedback signals which in turn change the output voltage level of the adapter system. It is, however, difficult for a manufacturer to incorporate a resistor in the separate connector. Further, the manufacturer must make a number of different connectors that have different resistors mounted therein. This increases costs of manufacturing and storage.

Further, a user must purchase a number of different connectors that have different resistors therein for obtaining DC outputs of different voltage levels.

It is thus desired to provide an electric adapter system for overcoming the above problems.

SUMMARY OF THE INVENTION

An object of the present invention is to provide an electric adapter system comprising a voltage level control circuit and a feedback circuit, both arranged inside an adapter casing, a connector releasably engageable with the adapter system changing the overall resistance of the feedback circuit that in turn change the output voltage levels of the voltage level control circuit, whereby the voltage level of the output of the adapter system is changed.

Another object of the present invention is to provide an electric adapter system comprising a switching device allowing a user to manually and selectively changing the overall resistance of the feedback circuit in order to change the voltage level of the adapter system.

To achieve the above objects, in accordance with the present invention, there is provided an electric adapter system comprising an adapter including a circuit connected between input and output connection devices respectively connectable with an external power source and a power consuming device. The output connection device is mateable with a connector forming an output member for engaging the power consuming device. The circuit comprises a voltage level control device and a feedback device. The voltage level control device supplies an output voltage to the output connection device via positive and negative power terminals. The feedback device comprises a plurality of voltage selection lines each having a different electric resistance whereby by selectively connecting one of the voltage selection lines to the negative power terminal, a feedback signal is generated by the feedback device and applied to the voltage level control device for changing the voltage level of the output voltage of the voltage level control device.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
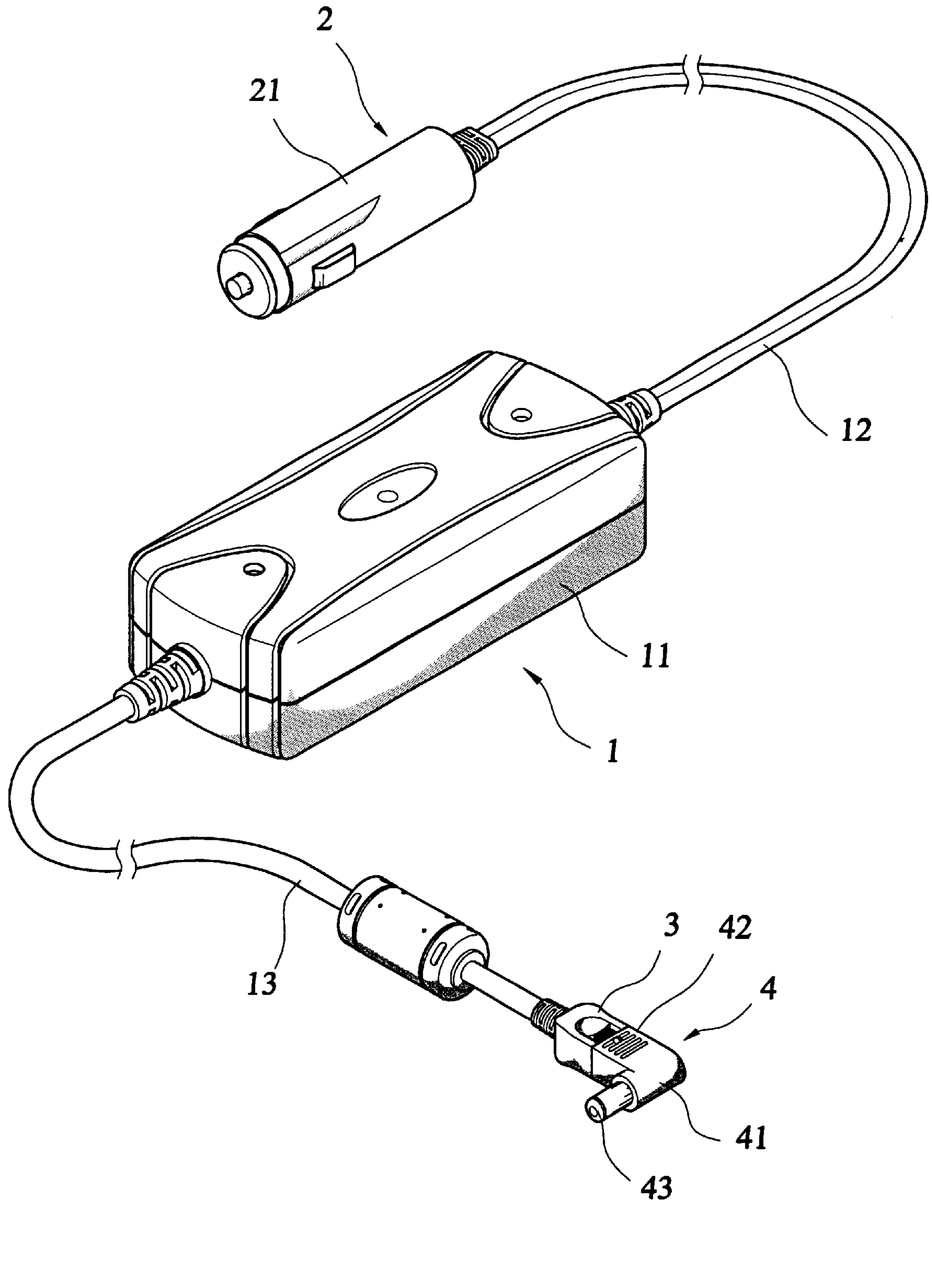
FIG. 1 is a perspective view of an adapter system constructed in accordance with the present invention.
Figure 2:
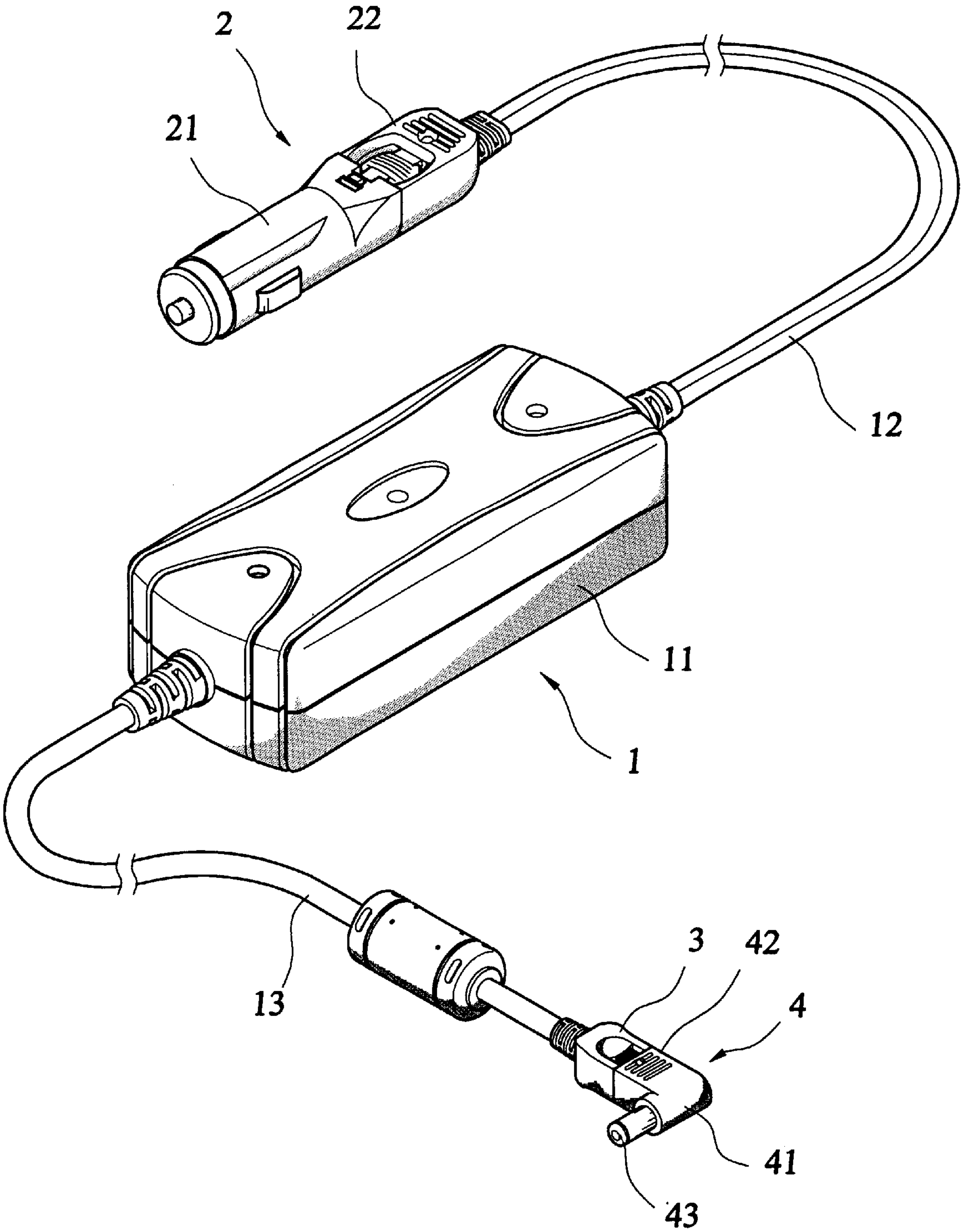
FIG. 2 is a perspective view of an adapter system of a different configuration constructed in accordance with the present invention.

With reference to the drawings and in particular to FIG. 1, an adapter system constructed in accordance with the present invention comprises an electric adapter 1 having a casing 11 and first and second cables 12, 13 extending from opposite ends of the casing 11 in opposite directions. A firs end connection device 2, comprising a plug 21 for engaging an external electric power socket of a car (not shown), is formed at a remote end of the first cable 12. Alternatively, the first end connection device 2 comprises an end plug 22 integrally formed with the first cable 12 as shown in FIG. 2 and the plug 21 is modified to be releasably and selectively engageable with the end plug 22. In the embodiment illustrated in FIG. 2, the end plug 22 itself is configured to engage an electric socket provided in a passenger seat of an airplane (not shown).

Figure 3:
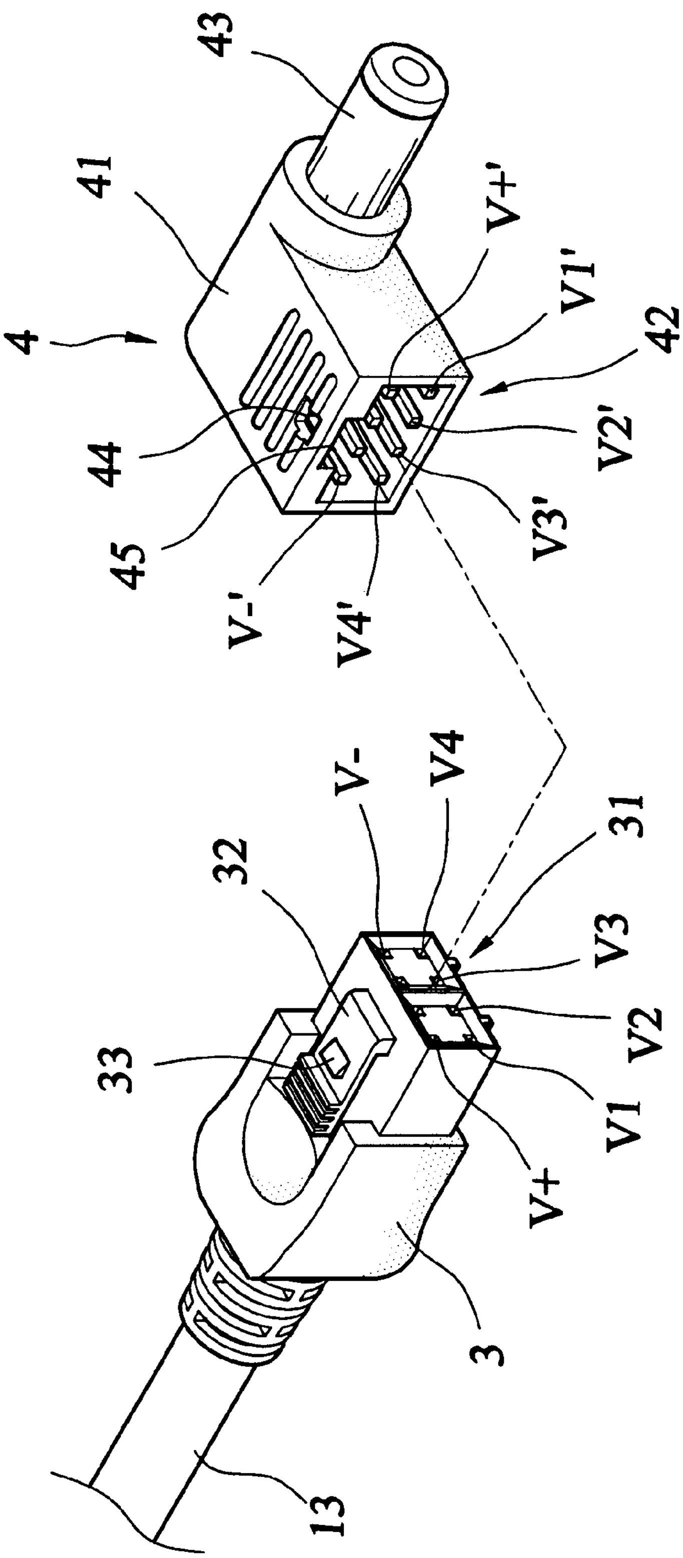
FIG. 3 is a perspective view showing an end connection device of the adapter system and a connector separated from the end connection device.

Also referring to FIG. 3, a second end connection device 3 is formed on a remote end of the second cable 13. The second end connection device 3 comprises an insulative housing (not labeled) having a front end surface in which a number of passages (not labeled) are defined to receive and retain therein conductive members, including a positive power terminal V+, a negative power terminal V− and voltage level selection terminals V1, V2, V3, V4.

The second end connection device 3 is configured to mate a separate connector 4. The connector 4 comprises a housing 41 in which a channel 42 is defined. An output member 43 in the form of a pin in the embodiment illustrated is mounted to the housing 41 and extending therefrom. A number of conductive members, including a positive power terminal V+', a negative power terminal V−' and voltage level selection terminals V1', V2', V3', V4'. The output member 43 has a positive terminal (V+) and a negative terminal (V−) respectively connected to the positive power terminal V+' and the negative power terminal V+' to receive electrical power therefrom. The output member 43 is to releasably engage a power consuming device, such as a notebook computer and a mobile phone (not shown) for powering/charging the power consuming device.

Preferably, the housing of the second end connection device 3 forms a resilient arm 32 on which a barb 33 is formed. Corresponding to the resilient arm 32, a groove 45 is defined in an inner surface (not labeled) of the channel 42 of the connector 4 for slidably receiving the resilient arm 32. An opening 44 is defined in the housing 41 of the connector 4 and in communication with the groove 45 for receivingly engaging the barb 33 to releasably secure the connector 4 to the second end connection device 3. By depressing the resilient arm 32 to disengage the barb 33 from the opening 44, the connector 4 can be separated from the second end connection device 3.

Figure 4:
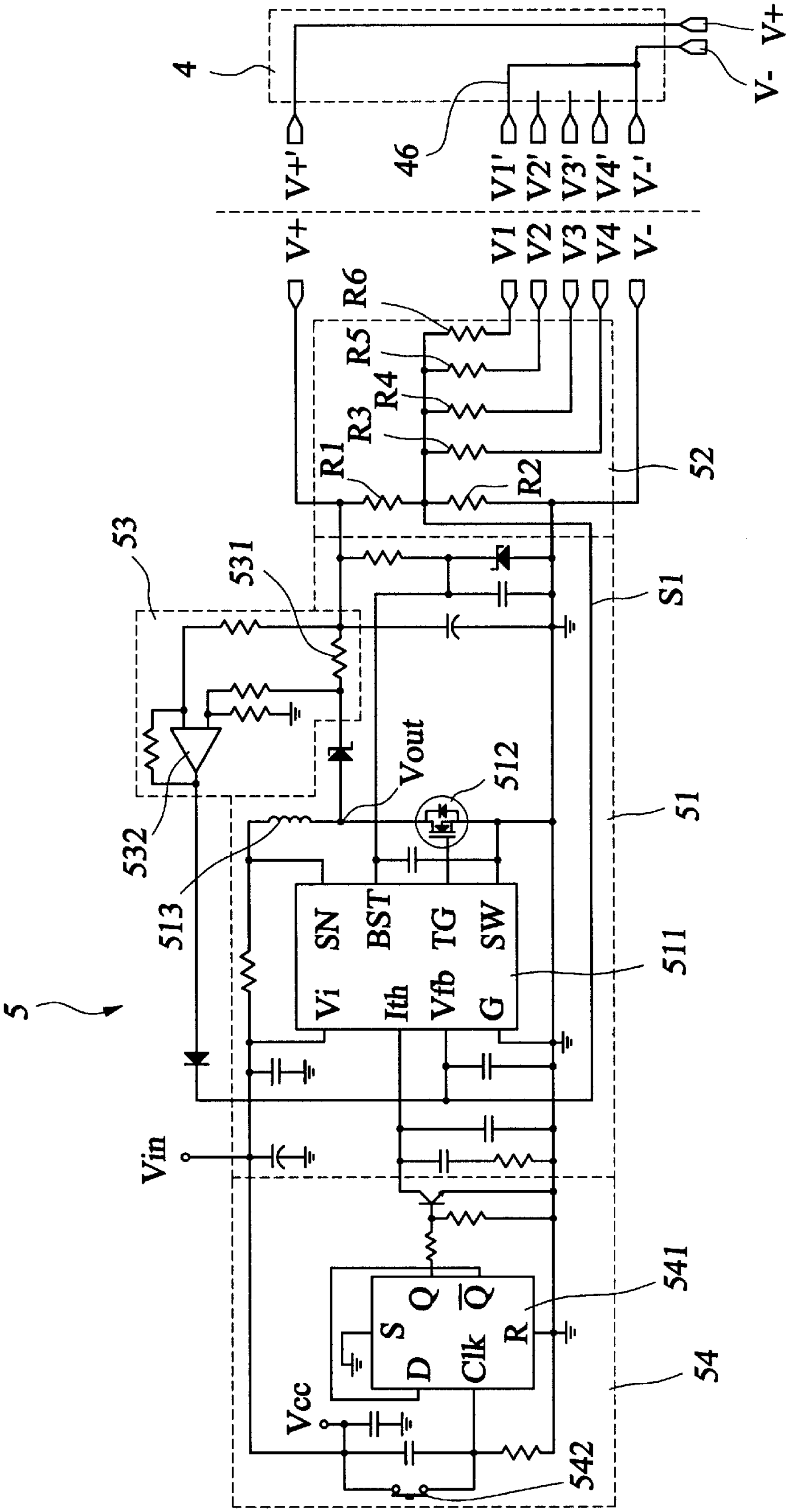
FIG. 4 is a circuit diagram of the adapter system in accordance with a first embodiment of the present invention.

Also referring to FIG. 4, a circuit 5 in accordance with a first embodiment of the present invention for converting an input DC voltage to an output DC voltage is arranged inside the casing 11 of the adapter 1. The circuit 5 comprises a voltage level control circuit 51 including a voltage conversion device 511, an N type MOS power transistor 512 and an inductor 513. The voltage conversion device 511 receives a DC input of a first voltage level from a DC power source Vin, which can be for example 10–13 volts of direct current, and converts the input voltage to an output voltage Vout having a second level that is different from, preferably greater than, the first voltage level. An example of the voltage conversion device 511 is IC model No. LTC 1624 available from Linear Technology Corporation, Milpitas, Calif., U.S.A.

The output voltage Vout is transmitted through the second cable 13 to the second end connection device 3 that includes terminals V+, V−, V1, V2, V3 and V4.

The circuit 5 of the present invention further comprises a feedback circuit 52 comprised of a number of resistors. The feedback circuit 52 is connected between the positive and negative power terminals V+, V− of the second end connection device 3 and comprises a feedback signal line S1 connected to the feedback terminal Vfb of the voltage conversion device 511. The feedback circuit 52 further comprises a number of voltage selection lines respectively connected to the voltage selection terminals V1, V2, V3, V4 of the second end connection device 3.

The feedback circuit 52 comprises a voltage divider comprising first and second voltage dividing resistors R1, R2 connected in series between the positive and negative power terminals V+, V−. A connection point between the first and second voltage dividing resistors R1, R2 is connected to the voltage conversion device 511 by the feedback signal line S1. The feedback circuit 52 also comprises a number of resistors R3, R4, R5, R6 respectively comprised of the voltage selection lines and each having a first end connected to the connection point of the voltage dividing resistors R1, R2 and a second end coupled to the voltage selection terminals V1, V2, V3, V4, respectively.

When the connector 4 mates the second end connection device 3, the positive power terminal V+', the negative power terminal V−, and the voltage selection terminals V1', V2', V3', V4' of the connector 4 respectively engage the positive power terminal V+, the negative power terminal V−, and the voltage selection terminals V1, V2, V3, V4 of the second end connection device 3. The connector 4 further comprises an output voltage selection line 46 having a first end connected to a negative power terminal V−' of the connector 4 and a second end selectively connected to any of the voltage selection lines via the voltage selection terminals V1–V4 of the second end connection device and the voltage selection terminals V1'–V4' of the connector 4. In the embodiment illustrated, the output voltage selection line 46 is connected to the first voltage selection terminal V1' and the corresponding voltage selection line. However, the output voltage selection line 46 can be switched to other voltage selection terminals and corresponding voltage selection line. The purpose of the output voltage selection line 46 is to short the selected one of the voltage selection terminals V1'–V4' and thus the corresponding voltage selection lines to the negative power terminal V−'. In this respect, the output voltage selection line 46 can be for example a jumper coupled between the selected one of the voltage selection terminals V1'–V4' and the negative power terminal V−'. This arrangement allows a manufacturer to make different connectors 4 with substantially the same structure and the manufacturing costs are reduced.

When the connector 4 mates the second end connection device 3, by selecting the voltage selection terminals V1'–V4' to connect to the negative power terminal V−', the overall resistance of the feedback circuit 52 is changed. The feedback signal applied, via the feedback signal line S1, to the voltage conversion device 511, is changed accordingly. This in turn changes the output voltage Vout of the voltage level control circuit 51. The output voltage Vout of the voltage level control circuit 51 is then transmitted to the second end connection device 3 and thus the connector 4 and eventually outputted by the output member 43 of the connector 4. The output voltage can then be applied to the power consuming to drive/charge the power consuming device. By setting different resistance of the feedback circuit 52 by selection of the voltage level selection terminals V1'–V4', a different output voltage can be obtained at the output member 43 of the connector 4.

The circuit 5 further comprises an overload protection circuit 53 comprising a current detection resistor 531 connected between the output voltage Vout of the voltage level control circuit 51 and the positive power terminal V+ of the second end connection device 3. A differential amplifier 532 has two inputs respectively connected to opposite sides of the current detection resistor 531 and an output connected to the feedback terminal Vfb of the voltage conversion device 511. When an excessive current is detected by the detection resistor 531, a signal is applied to the voltage conversion device 511 which in turn limits the current to an acceptable level.

The circuit 5 also comprises a power saving circuit 54 comprising a D flip-flop 541 and a manual switch 542. The manual switch 542 can be manually operated to stop the output of the voltage conversion device 511 for saving power.

Figure 5:
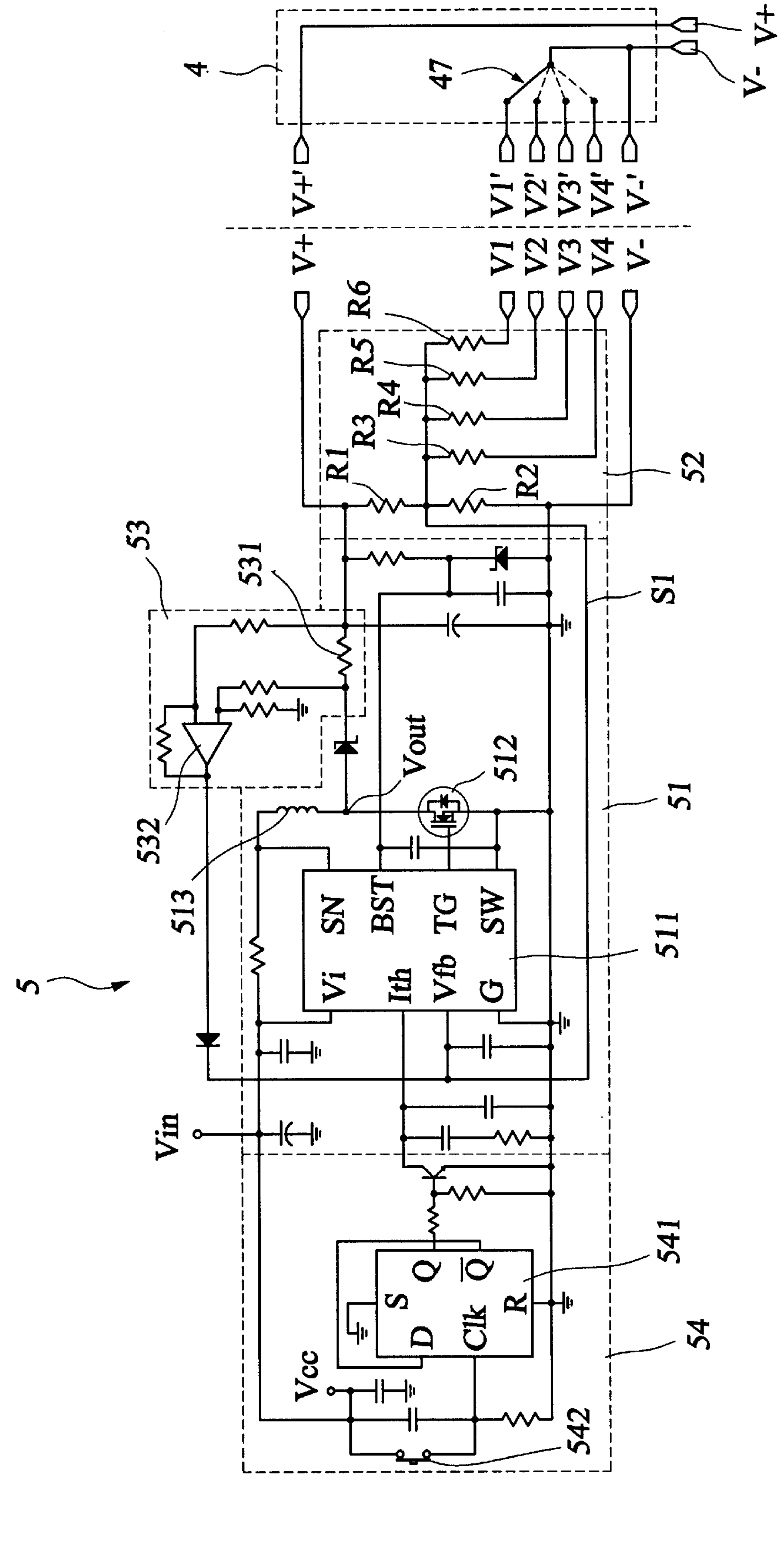
FIG. 5 is a circuit diagram of the adapter system in accordance with a second embodiment of the present invention.

Although in the first embodiment with reference to FIG. 4, one of the voltage selection terminals V1'–V4' and the corresponding voltage selection line is selected and fixedly connected to the negative power terminal V−', it is possible to provide a changeable connection between the voltage selection terminals V1'–V4' (and thus the corresponding voltage selection line) and the negative power terminal V−'. FIG. 5 shows a second embodiment of the present invention that allows a user to changeably connect any one of the voltage selection terminals V1'–V4' (and the corresponding voltage selection line) to the negative power terminal V–'. In the second embodiment shown in FIG. 5, the connector 4 comprises a switch 47 for selectively connecting any one of the voltage selection terminals V1'–V4' to the negative power terminal V–'. By connecting the negative power terminal V–' to different ones of the voltage selection terminals V1'–V4', a different level of DC voltage can be obtained at the output member 43 of the connector 4.

Figure 6:
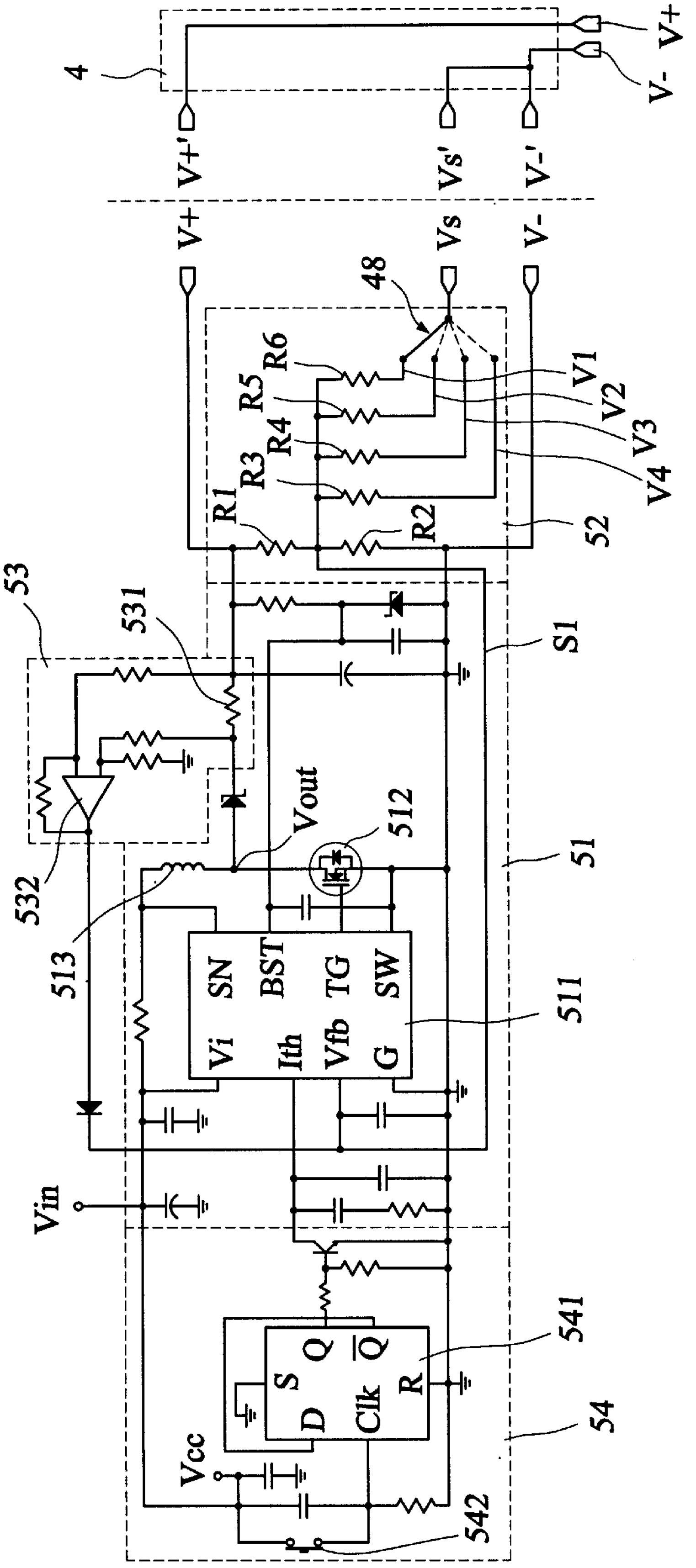
FIG. 6 is a circuit diagram of the adapter system in accordance with a third embodiment of the present invention.

FIG. 6 shows a third embodiment of the circuit of the adapter system of the present invention. The circuit 5 comprises a switch 48 arranged in the casing 1. The switch 48 is changeably switched among the second ends of the resistors R3–R6 (namely the voltage selection lines or the voltage selection terminals V1–V4) and has an output connected to a conductive member Vs fixed in the housing of the second end connection device 3. In this case, the conductive members associated with voltage selection terminals V1–V4 are omitted from the housing of the second end connection device 3. Corresponding to omission of the voltage selection terminals V1–V4 of the second end connection device 3, the voltage selection terminals V1'–V4' of the connector 4 are omitted too. Instead, a conductive member labeled Vs' is provided in the connector 4 for engaging the output Vs of the switch 48 of the circuit 5. The conductive member Vs' is connected to the negative power terminal V–'.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An electric adapter system comprising: an adapter comprising:

a casing, a first end connection devise adapted to connect to an external power source, a second end connection device comprising a first positive power terminal, a first negative power terminal and a plurality of first voltage selection terminals, and a circuit arranged inside the casing and connected between the first and second end connection devices, the circuit comprising:

voltage level control means comprising a voltage conversion means for converting an input voltage received from the external power source via the first end connection device into an output voltage of a selected level to be transmitted to the second end connection device, and a feedback circuit connected between the first positive and negative terminals of the second end connection device and having a feedback signal line connected to a feedback terminal of the voltage conversion means, the feedback circuit comprising a plurality of voltage selection lines respectively connected to the first voltage selection terminals of the second end connection device, and a connector releasably engageable with the second end connection device, the connector comprising a housing defining a channel for receivingly engaging the second end connection device, a second positive power terminal, a second negative power terminal, second voltage selection terminals being arranged inside the channel for respectively engaging the first positive power terminal, the first negative power terminal and the first voltage selection terminals of the second end connection device, an output voltage selection line having a first end connected to the second negative power terminal and a second end selectively connected to one of the second voltage selection terminals, and an output member adapted to electrically engage an external power consuming device, the output member comprising a positive terminal and a negative terminal respectively connected to the second positive power terminal and the second negative power terminal, wherein when the connector mates the second end connection device, the selective connection of the second end of the output voltage selection line with different ones of the second voltage selection terminals changes a feedback signal applied to the voltage conversion means via the feedback signal line thereby changing voltage level of the output voltage of the voltage level control means that is transmitted to the second end connection device and the connector.

2. The electric adapter system as claimed in claim 1, wherein the first end connection device is connected to the adapter by a first cable.

3. The electric adapter system as claimed in claim 1, wherein the second end connection device is connected to the adapter by a second cable.

4. The electric adapter system as claimed in claim 1, wherein the feedback circuit comprises first and second voltage dividing resistors connected in series between the first positive and negative power terminals of the second end connection device, a connection point between the first and second voltage dividing resistors being connected to the feedback signal line, a plurality of resistors each comprised of the corresponding voltage selection line and having a first end connected to the connection point and a second end connected to the first voltage selection terminals of the second end connection device respectively.

5. The electric adapter system as claimed in claim 1, wherein the voltage conversion means comprises a device for converting a direct current input having a first voltage level to a direct current output having a second voltage level that is greater than the first voltage level.

6. The electric adapter system as claimed in claim 1, wherein the circuit arranged inside the casing further comprises an overload protection circuit comprising:

a current detection resistor connected between the output voltage of the voltage level control means and the first positive power terminal; and a differential amplifier having two inputs connected on opposite sides of the current detection resistor and an output connected to the feedback terminal of the voltage conversion means;

whereby when an excessive current is detected by the current detection resistor, a signal is applied to the feedback terminal of the voltage conversion means to limit current level of the output voltage.

7. The electric adapter system as claimed in claim 1, wherein the adapter further comprises a power saving circuit comprising a manual switch for selectively and manually cutting off the output voltage.

8. An electric adapter system comprising:

an adapter comprising:

a casing, a first end connection device adapted to connect to an external power source, a second end connection device comprising a first positive power terminal, a first negative power terminal and at least one additional first terminal, and a circuit arranged inside the casing and connected between the first and second end connection devices, the circuit comprising:

voltage level control means comprising a voltage conversion means for converting an input voltage received from the external power source via the first end connection device into an output voltage of a selected level to be transmitted to the second end connection device, and a feedback circuit connected between the first positive and negative terminals of the second end connection device and having a feedback signal line connected to a feedback terminal of the voltage conversion means, the feedback circuit comprising a plurality of voltage selection lines, each forming a terminal;

a connector releasably engageable with the second end connection device, the connector comprising:

a housing defining a channel for receivingly engaging the second end connection device, a second positive power terminal, a second negative power terminal, at least one additional second terminal being arranged inside the channel for respectively engaging the first positive power terminal, the first negative power terminal and the additional first terminals of the second end connection device, and an output member adapted to electrically engage an external power consuming device, the output member comprising a positive terminal and a negative terminal respectively connected to the second positive power terminal and the second negative power terminal; and switching means for selectively connecting the second negative power terminal to the terminal of one of the voltage selection lines; wherein when the connector mates the second end connection device, the selective connection of the second negative power terminal to different ones of the voltage selection lines changes a feedback signal applied to the voltage conversion means via the feedback signal line thereby changing voltage level of the output voltage of the voltage level control means that is transmitted to the second end connection device and the connector.

9. The electric adapter system as claimed in claim 8, wherein the connector comprises a plurality of additional second terminals, the second end connection device comprising a plurality of additional first terminals that are respectively engageable with the additional second terminals when the connector mates the second end connection device, and wherein the switching means is arranged in the connector and is selectively connected to the voltage selection lines via the additional second terminals and the additional first terminals.

10. The electric adapter system as claimed in claim 8, wherein the switching means is arranged in the casing of the adapter for selectively connecting the terminal of one of the voltage selection lines to the additional first terminal that engages the additional second terminal in connection with the second negative power terminal of the connector.

11. The electric adapter system as claimed in claim 8, wherein the feedback circuit comprises first and second voltage dividing resistors connected in series between the first positive and negative power terminals of the second end connection device, a connection point between the first and second voltage dividing resistors being connected to the feedback signal line, a plurality of resistors each comprised of the corresponding voltage selection line and having a first end connected to the connection point and a second end connected to the terminal of the voltage selection line.

12. The electric adapter system as claimed in claim 8 wherein the voltage conversion means comprises a device for converting a direct current input having a first voltage level to a direct current output having a second voltage level that is greater than the first voltage level.

13. The electric adapter system as claimed in claim 8, wherein the circuit arranged inside the casing further comprises an overload protection circuit comprising:

a current detection resistor connected between the output voltage of the voltage level control means and the first positive power terminal; and a differential amplifier having two inputs connected on opposite sides of the current detection resistor and an output connected to the feedback terminal of the voltage conversion means; whereby when an excessive current is detected by the current detection resistor, a signal is applied to the feedback terminal of the voltage conversion means to limit current level of the output voltage.

14. The electric adapter system as claimed in claim 8, wherein the adapter further comprises a power saving circuit comprising a manual switch for selectively and manually cutting off the output voltage.

* * * * *